US005912759A

United States Patent [19]

Good et al.

[11] Patent Number: 5,912,759

[45] Date of Patent: Jun. 15, 1999

[54] ELECTROCHEMICAL DISPLAY CELL WITH FOCUSED FIELD

[75] Inventors: David M. Good; Mark A. Shadle, both of Peachtree, Ga.; Gerrit L. Verschuur; Chauncey T. Mitchell, Jr., both of Lakeland, Tenn.; Robert Parker, Palm Desert, Calif.

[73] Assignee: Wisconsin Label Corporation, Algoma, Wis.

[21] Appl. No.: 09/067,374

[22] Filed: Apr. 27, 1998

Related U.S. Application Data

[60] Provisional application No. 60/045,051, Apr. 28, 1997.

[51] Int. Cl.[6] .......... G09G 3/00

[52] U.S. Cl. .......... 359/297; 429/8; 429/90; 29/623.1

[58] Field of Search .......... 359/253, 254, 359/265, 267, 237, 297; 429/8, 90, 113, 116; 29/623.1

[56] References Cited

U.S. PATENT DOCUMENTS

| | | | |
|---|---|---|---|
| 3,096,371 | 7/1963 | Hespenheide | 359/297 |
| 3,891,457 | 6/1975 | Auborn | 136/6 |
| 3,940,205 | 2/1976 | Crandall et al. | 350/160 R |
| 4,120,568 | 10/1978 | Deb et al. | 359/265 |
| 4,153,345 | 5/1979 | Duchéne et al. | 359/265 |
| 4,240,717 | 12/1980 | Camlibel et al. | 359/297 |
| 4,279,475 | 7/1981 | Delapierre et al. | 359/297 |
| 4,331,386 | 5/1982 | Minami | 604/361 |
| 4,356,818 | 11/1982 | Macias et al. | 359/265 |
| 4,361,386 | 11/1982 | Meyer | 359/297 |
| 4,418,129 | 11/1983 | Goebel | 429/91 |
| 4,426,643 | 1/1984 | Martin | 359/297 |
| 4,561,729 | 12/1985 | Heinz et al. | 359/265 |
| 4,618,218 | 10/1986 | Shaw et al. | 359/297 |
| 4,703,754 | 11/1987 | Ibbott | 128/383 |
| 4,804,275 | 2/1989 | Kang et al. | 374/162 |
| 4,876,441 | 10/1989 | Hara et al. | 235/488 |
| 4,977,046 | 12/1990 | Bleszinski, Jr. et al. | 429/174 |
| 5,035,965 | 7/1991 | Sangyoji et al. | 429/124 |
| 5,197,958 | 3/1993 | Howell | 604/361 |
| 5,250,905 | 10/1993 | Kuo et al. | 324/435 |
| 5,264,830 | 11/1993 | Kline et al. | 340/604 |
| 5,339,024 | 8/1994 | Kuo et al. | 324/435 |
| 5,350,645 | 9/1994 | Lake et al. | 429/124 |
| 5,354,289 | 10/1994 | Mitchell et al. | 604/361 |
| 5,392,032 | 2/1995 | Kline et al. | 340/604 |
| 5,396,177 | 3/1995 | Kuo et al. | 324/435 |
| 5,418,086 | 5/1995 | Bailey | 429/93 |
| 5,500,759 | 3/1996 | Coleman | 359/270 |
| 5,516,598 | 5/1996 | Visco et al. | 429/92 |
| 5,523,179 | 6/1996 | Chu | 429/104 |
| 5,532,077 | 7/1996 | Chu | 429/102 |
| 5,582,623 | 12/1996 | Chu | 29/623.1 |
| 5,614,586 | 3/1997 | Tang et al. | 524/817 |
| 5,627,472 | 5/1997 | Ofer et al. | 324/435 |

FOREIGN PATENT DOCUMENTS

| | | |
|---|---|---|
| 0638952 | 2/1995 | European Pat. Off. . |
| WO 9306474 | 4/1993 | WIPO . |

*Primary Examiner*—Georgia Epps
*Assistant Examiner*—Margaret Burke
*Attorney, Agent, or Firm*—Eugene Stephens & Associates

[57] ABSTRACT

An electrochemical display cell has a layered construction including two electrode layers separated by a dielectric layer. Concentric openings are formed in the dielectric layer and one of the electrode layers exposing a designated portion of the other electrode layer. An electrolyte layer overlaps the one electrode layer and the designated portion of the other electrode layer. When activated, current flow cascades through the openings in the one electrode layer and the dielectric layer to the designated portion of the other electrode layer supporting an electrochemical reaction that erodes the designated portion revealing underlying visual information.

74 Claims, 4 Drawing Sheets

10 36 34 40 48 44 52 46 32 30 46 50 28 28 26 16 14 18 20 38 42 12

ELECTROCHEMICAL DISPLAY CELL WITH FOCUSED FIELD

This application claims the benefit of U.S. Provisional Application No. 60/045,051, filed on Apr. 28, 1997, which provisional application is incorporated by reference herein.

TECHNICAL FIELD

The invention relates to thin flexible displays incorporating electrochemical mechanisms for displaying visual information. The displays are preferably self-powered, irreversible, low cost, and formed in layers that can be printed on an in-line press.

BACKGROUND

Electrochemical reactions are among the mechanisms that have been used for selectively displaying visual information ranging from pure color to text or graphics. The visual information can be hidden from sight and later revealed by the electrochemical reactions, or the electrochemical reactions can be controlled to produce the visual information.

For example, U.S. Pat. No. 5,500,759 to Coleman discloses an electrochemical display that can be activated to change color in a predetermined pattern laid out by electrodes. Coleman's design requires an external power source and special electrochromic materials that can be quite expensive. U.S. Pat. No. 4,804,275 to Kang et al. discloses a self-powered electrochromic timing device in which a color change boundary in an electrochromic material is advanced by a gradual dissolution of an electrode. Kang et al.'s electrochromic reactions require a strong acid and other materials that add cost and pose problems for manufacture and use.

Electrode dissolution has also been used in electrochemical display cells to reveal information otherwise obscured by an electrode. For example, U.S. Pat. No. 4,153,345 to Duchéne et al. discloses an electrolytic display cell in which a pattern of thin metal film is alternately dissolved into a liquid electrolyte and redeposited onto conductive portions of a transparent electrode. An insulator covers selected portions of the transparent electrode to pattern the depositing metal film. The polarity of an external power source controls whether the display undergoes dissolution or deposition.

Duchéne et al. capture the electrolyte between two electrodes. One of the electrodes is a transparent film such as $In_2O_3$ or $SnO_2$; and the other electrode, which undergoes dissolution and deposition, is made from a material such as silver. Both electrode materials can be quite expensive, and a separate power source is required to operate the display. Manufacture is also complicated by locating a liquid electrolyte between the two electrodes, requiring each to be supported on a separate substrate.

U.S. Pat. No. 5,339,024 to Kuo et al. discloses a charge indicator cell connected in parallel with a main cell. An anode carried on a conductive substrate of the indicator cell is gradually oxidized to reveal a message written in ink on an underlying layer. One embodiment arranges the electrolyte between the anode and a cathode in the form of a stack. Another embodiment arranges the anode and cathode side-by-side and fashions the electrolyte as a porous film straddling both electrodes. Both embodiments are subject to "islanding", where portions of the anode become electronically isolated from the cathode in advance of the anode's total disappearance. In the side-by-side arrangement, the path of ion conduction becomes increasingly inefficient as the anode erodes further from the cathode. Separate substrates are also used in both embodiments for supporting the electrodes, which complicates manufacture.

SUMMARY OF INVENTION

Our new display cells, which are preferably both self-powered and irreversible, can be arranged in layers to achieve such further objectives as facilitating in-line production, lowering production costs, enhancing performance, simplifying use, and integrating the display cells with other printed products such as labels. Two electrode layers of our display cells can be arranged in the form of a stack with one electrode layer only partially covering the other. An electrolyte layer can be arranged to cover laterally separated portions of the two electrode layers. This arrangement facilitates printing of both electrode layers and the electrolyte layer on the same substrate or web. An interface between the two electrodes can be shaped to optimize performance.

One of the electrode layers is preferably a thin continuous film deposited directly on the web. The other layers, which include the other electrode layer, a dielectric layer separating the two electrode layers, and the electrolyte layer, can be printed on the film in repeating patterns one layer over the other to produce a succession of electrochemical display cells. Aligned openings formed through portions of the other electrode layer and the dielectric layer expose portions of the thin-film electrode layer. A common face of the electrolyte layer contacts both the remaining portions of the other electrode layer and the exposed portions of the thin-film electrode layer to complete an ionically conductive pathway between the electrode layers. A flow of current (i.e., activation of the cell) causes the exposed portions of the thin-film electrode to disappear in a controlled manner to reveal predetermined visual information.

Unlike other disappearing electrode displays, the path of ion conduction between electrode layers takes place through a patterned opening or aperture in one of the electrode layers. For example, the thin-film electrode layer can function as an anode, and the other electrode layer can function as a cathode. Openings through the cathode layer and the dielectric layer are aligned for exposing a portion of the anode layer. The electrolyte layer is applied over the surface of the cathode layer including its opening through which the electrolyte comes into contact with the exposed portion of the anode layer.

Completing a separate electronically conductive pathway between the anode and cathode layers triggers an electrochemical reaction that produces a focused electric field within the electrolyte layer. Current flow cascades from the surface of the cathode layer through the aligned openings in the cathode and dielectric layers to the exposed portion of the anode layer. The spontaneous electrochemical reaction supported by the focused flow of current erodes (i.e., oxidizes) the exposed portion of the anode layer revealing visual information such as color, text, or graphics printed behind the anode layer.

Experimental models produced on a press indicate that for limited size openings in the cathode and dielectric layers (e.g., one centimeter or less), the electrochemical erosion of the exposed portion of the anode layer is usually total. The openings are preferably circles for revealing underlying colors or graphics but can also take a variety of other geometric shapes or even fractal shapes including characters or other graphic patterns. In addition, multiple openings can be formed through the same cathode and dielectric layers exposing additional portions of the same anode layer for displaying more information such as a series of letters or characters. The visual information revealed as a result of anode erosion can be printed on substrate backings of the anode layer or the cathode layer to allow viewing through the openings in the cathode and dielectric layers.

The continuous thin-film anode layer is preferably a sputtered or metalized aluminum deposited onto a transparent substrate such as a polyester or other polymer-based film. Aluminum, along with certain other metals and metal alloys, can be used as non-reversible anodes. Carbon along with certain materials such as manganese dioxide, silver, or other metals well separated in the electrochemical scale from the anode material can be used as cathodes. By suitable choice of the cathode and electrolyte materials with respect to the anode material, the rate of anode disappearance (i.e., clearing rate) can be controlled. Other influences on the clearing rate include the sizes and shapes of the openings in the cathode and dielectric layers, the size and shape of the cathode layer, the conductivity of the electronically conductive pathway between the anode and cathode layers, and the conductivity within the anode and cathode layers themselves.

The electrolyte can be in the form of a liquid or gel or can be mixed in with an adhesive such as an animal glue or a pressure-sensitive, UV-curable variety. The electrolyte mix can also function as a binder for the overall structure and as an additional spacer between the anode and cathode layers.

In other embodiments, the ionically conductive pathway between electrodes is interrupted to control or defer activation of the display cell. For example, the electrolyte layer can be separated from one or both electrodes until required for use. This can extend shelf life, which could otherwise be shortened by unwanted erosion of the anode by components of the electrolyte mix. Activation is deferred by maintaining the electrolyte layer out of contact with one of the electrode layers until it is time to place the display cell into service. The electrolyte can be brought into contact with the electrolyte layers by physically joining different parts of the display cell or by rupturing a temporary barrier separating the electrolyte layer from one of the electrode layers.

Our new display is particularly well suited for manufacture along an in-line press. All of the active layers including the two electrodes, the electrolyte, and the electronic connection between the electrodes can be printed on a single web. Other printed layers or webs can be combined to provide the visual information, sealing for the electrolyte, or adaptations to other products such as pressure-sensitive labels. Alternatively, the electrolyte layer can be printed on a separate web and laminated to the two electrode layers to complete a similar succession of display cells. The completed display cells are particularly useful for such products as game pieces, message cards, tamper-evident seals, time-elapsed indicators, and other single-use indicators.

For purposes of this invention and its continuing description, the terms "erode", "oxidize", "dissolve", "clear", and "disappear" are used interchangeably as they pertain to the systematic removal of thin-film electrodes.

DRAWINGS

FIGS. 3A, 3B, 3C, 3D, 3E, and 3F show progressive stages of assembly for the display cell in an order that the various layers could be applied along an in-line press.

Figure 4:
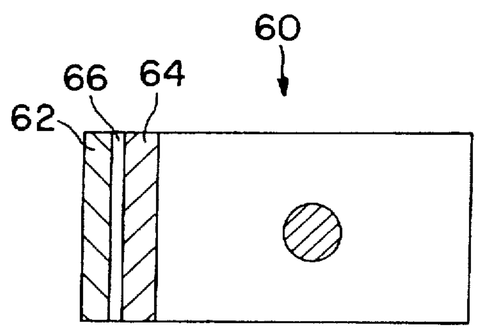
Figure 3A:
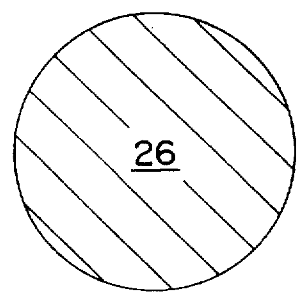
Figure 3B:
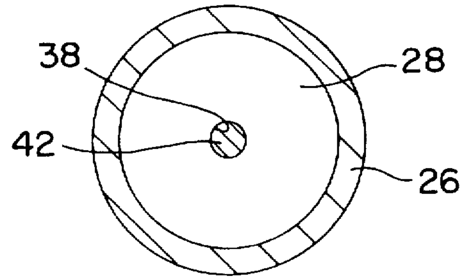
Figure 3C:
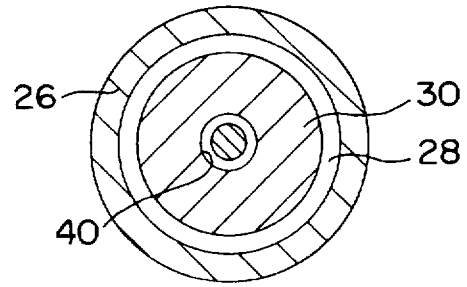
Figure 3D:
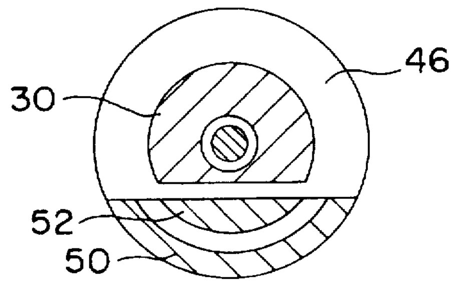
Figure 3E:
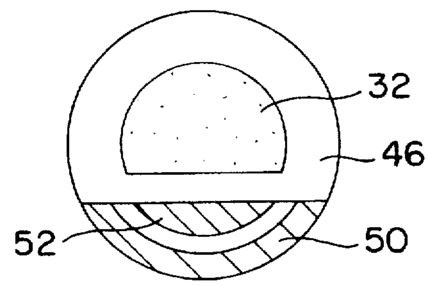
Figure 3F:
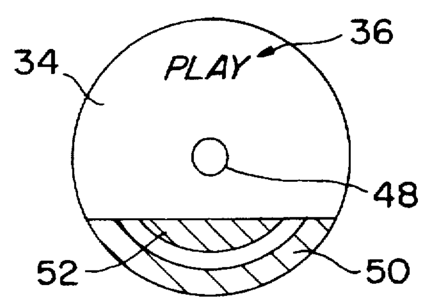

FIG. 4 is a plan view of a similar self-powered display cell having a rectangular shape and an alternative electrical switch.

Figure 5:
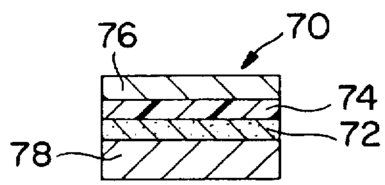

FIG. 5 is a cross-sectional view of a switch arm for activating the display cell of FIG. 4.

Figure 6A:
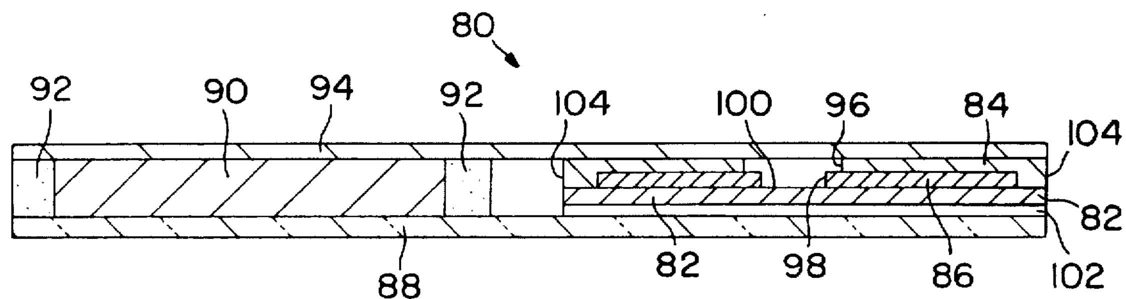
Figure 6B:
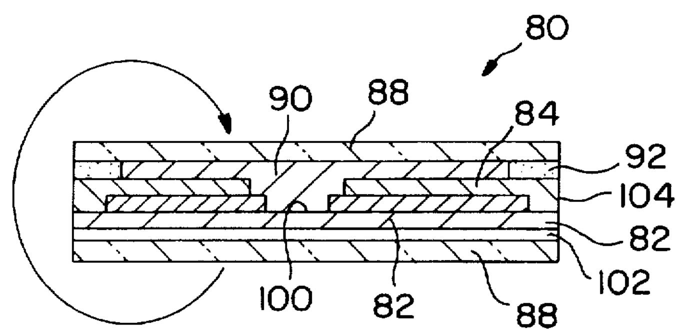

FIGS. 6A and 6B provide cross-sectional illustrations of a display cell in both inactive and active states distinguished by the state of ionic conduction between electrode layers.

Figure 7:
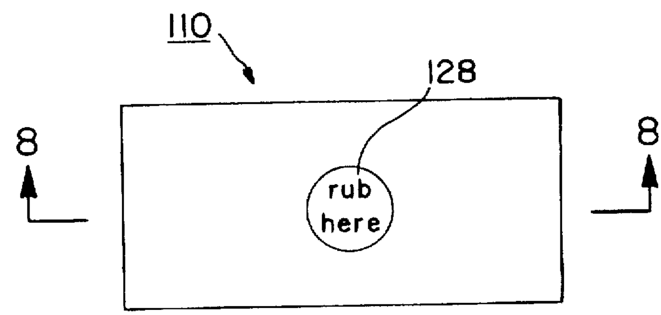

FIG. 7 is a plan view of another display cell distinguished by an ionically conductive pathway interrupted by a passivation layer.

Figure 8:
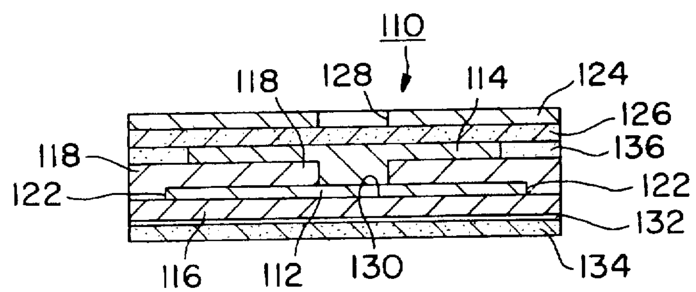

FIG. 8 is a cross-sectional view taken along line 8—8 of FIG. 7.

Figure 9:
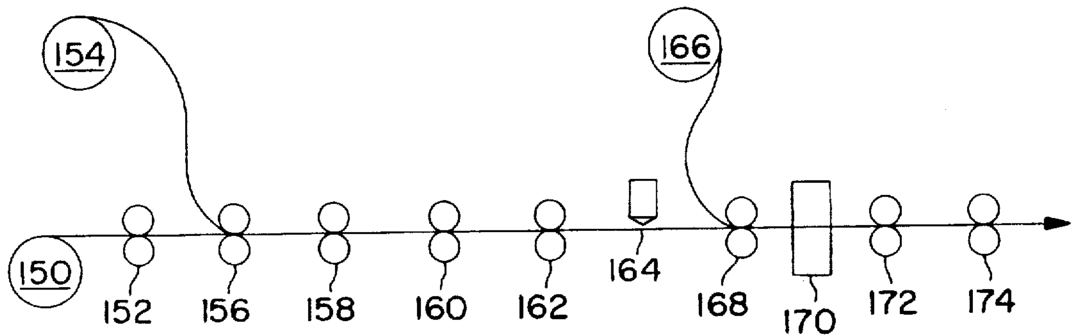

FIG. 9 is a diagram of an in-line press for manufacturing the display cells.

DETAILED DESCRIPTION

A self-powered (voltaic) display cell 10 depicted in FIGS. 1–3F is mounted on a circular label 12 having a common substrate 14. The label 12 includes a graphics layer 16, which can be printed on either side of the common substrate 14, and a pressure-sensitive adhesive layer 18, which is protected by a release liner 20. The common substrate 14 is preferably a transparent film, such as Mylar polyester or PET (polyethylene terephtalate). The graphics layer 16, which can range from a patch of color to text or other graphic patterns, provides a visible image for eventual display. The release liner includes a layer of release, such as silicone, on another substrate, such as kraft paper.

The display cell 10 has a thin metal film electrode (e.g., anode) layer 26, which has been deposited (e.g., sputtered or otherwise metalized) onto the common substrate 14. Aluminum is the preferred metal of the thin metal film because of its low cost and ready availability in thin-film form. A separate backing layer could also be used to support the thin-film electrode layer 26 during its manufacture and subsequent assembly with the substrate 14.

A dielectric layer (e.g., varnish) 28 and another electrode (e.g., cathode) layer 30 are printed in succession on the thin-film electrode layer 26 in patterns that form concentric circular apertures (openings) 38 and 40 through which a designated portion 42 of the electrode layer 26 remains exposed. The circular aperture 38 of the dielectric layer 28 is a little smaller than the circular aperture 40 of the electrode layer 30 to assure that the two electrode layers 26 and 30 remain electronically isolated within the designated portion 42. The electrode layer 30 can be made of carbon and function as its own current collector, or another electrode material such as manganese dioxide could be printed over a carbon collector. The electrode layer 30 could also be constructed as a thin metal layer, such as silver, deposited onto a backing layer that could augment or even replace the dielectric layer 28.

An electrolyte layer 32, which can also be applied by printing or other means such as lamination, overlaps a surface 44 of the electrode layer 30 and the designated portion 42 of the electrode layer 26 for providing an ionically conductive pathway between the electrode layers 26 and 30. A common face of the electrolyte layer 32 contacts both electrode layers 26 and 30. Another clear substrate 34 made from a material such as PET covers the electrolyte layer 32 and is bonded to the common substrate 14 with a dielectric adhesive layer 46, such as hot-melt adhesive, that forms a peripheral boundary of the electrolyte layer 32. Preferably, the electrolyte layer 32 also has adhesive properties for further attaching the clear substrate 34. An electrolytic adhesive can be made by mixing an electrolytic salt into an adhesive, such as a pressure-sensitive or UV-curable adhesive or an animal glue.

The substrate 34 is covered by a graphics layer 36 that includes a window 48 aligned with the apertures 38 and 40 through which the designated portion 42 of the electrode layer 26 is visible. The graphics layer 36 preferably contains printed information related to the eventual display of the graphics layer 16 in the window 48.

FIGS. 3A–3F illustrate a step-by-step construction of the display cell 10, which is particularly well suited for manufacture by an in-line press. To the electrode layer 26 is applied the dielectric layer 28 in a pattern that includes a circular aperture 38 surrounding the designated portion 42. The electrode layer 30 is applied entirely within the dielectric layer 28 with its circular aperture 40 aligned with the circular aperture 38 of the dielectric layer 28. The dielectric adhesive layer 46 surrounds limited peripheral portions of the dielectric layer 28 and the electrode layer 30 and provides a mask for confining the electrolyte layer 32 within the cell. The clear substrate 34 covers all but a similar remaining part of the cell periphery. The window 48 in the graphics layer 36 is aligned with the concentric apertures 38 and 40 and the designated portion 42. Along a remaining part of the cell periphery, exposed portions 50 and 52 of the electrode layers 26 and 30 provide electrical contacts for completing an electronically conductive pathway between the electrode layers 26 and 30. An electronically conductive layer (not shown), such as carbon, can be applied to the exposed portion 50 of the thin-film electrode layer 26 to increase its durability for electrical contact.

Folding the exposed portion 50 of the electrode layer 26 into contact with the exposed portion 52 of the electrode layer 30 produces a path for current to flow through the display cell 10 and triggers an electrochemical reaction that produces a focused electric field within the electrolyte layer 32. Current flow cascades from the surface 44 of the electrode layer 30 through the concentric apertures 38 and 40 to the designated portion 42 of the electrode layer 26. The spontaneous electrochemical reaction supported by the focused flow of current erodes (i.e., oxidizes) the designated portion 42 revealing the graphics layer 16, which can contain visual information such as color, text, or graphics.

The display cell 10 is substantially depleted when the designated portion 42 is cleared because no other portion of the thin-film electrode layer 26 is initially exposed to the electrolyte layer 32, except that the electrolyte layer 32 will then begin to creep slowly between the dielectric layer 28 and the common substrate 14 eroding adjacent portions of the electrode layer 26 at a much slower rate.

Display cell 60 depicted in FIG. 4 is similar in many respects to the display cell 10 of the preceding figures but has a rectangular shape and an alternative electrical switch whose switch arm 70 is depicted in FIG. 5. Similar to the preceding embodiment, exposed portions 62 and 64 of two electrode layers separated by a dielectric layer 66 function as electrical contacts. The switch 70 is sized to complete an electronically conductive pathway between the exposed electrode portions 62 and 64.

As shown in FIG. 5, the switch arm 70 is made by means of a conductive tape 72 laminated onto a strip of thin metallic film 74, such as copper or aluminum, and overlaid by a graphics layer 76 indicating how the user is to place the switch to activate the display cell 60. A release liner 78 protects the conductive tape 72 until ready for use. An example of the conductive tape 72 is 3M product number 9703. The referenced tape 72 is conductive normal to its plane of lamination; and the metallic film 74, which is in contact with the tape 72, carries current parallel through this plane for bridging the gap between the electrode portions 62 and 64.

Activation of the display cell 60 is accomplished by removing the release liner 78 and applying the switch arm 70 across the exposed electrode portions 62 and 64. The conductive tape 72 forms a permanent bond with the electrode portions 62 and 64 so that no further action is required to maintain the display cell 60 in an active state.

In place of a separate switch arm 70, a similar conductive tape could be applied to just one of the electrode portions 62 and 64 and covered with a release liner to protect the tape prior to use. After peeling away the release layer, the electrode portions 62 and 64 could be permanently folded together trapping the conductive tape between them. Such single-pole switching can also be accomplished in a variety of other ways including as a consequence of other actions that are related to the use of the display cell. For example, the display cells could be used to provide tamper evidency by activating when a bottle or other form of packaging is opened or closed.

The ionically conductive pathway between the electrodes could also be interrupted to provide a switching function in addition to or as a replacement for one of the just-described electrical switches that interrupt the electrically conductive pathway between the electrodes. Interrupting the ionically conductive layer, such as by isolating the electrolyte layer from one or both of the electrode layers, can have the added advantage of extending shelf life of the display cells by reducing the risk of self-activation.

FIGS. 6A and 6B depict inactive and active layouts of a display cell 80, whose ionically conductive pathway is interrupted to provide a switching function. In the inactive state as depicted by FIG. 6A, two electrode layers 82 and 84 partially separated by a dielectric layer 86 are mounted on one-half of a transparent substrate 88, and an electrolyte layer 90 captured within a surrounding dielectric adhesive layer 92 is mounted on the other half of the transparent substrate 88. The electrode layer 82 is preferably a thin film, such as aluminum, deposited onto a backing 102. Graphics (not shown) can be located on either side of the transparent substrate 88 or the backing 102 to give meaning to the display 80. A release layer 94 protects exposed surfaces of the electrolyte and dielectric adhesive layers 90 and 92.

Concentric openings 96 and 98 are formed in the electrode layer 84 and the dielectric layer 86 exposing a designated portion 100 of the electrode layer 82. The dielectric layer 86 separates (i.e., electronically isolates) the electrode layers 82 and 84 in the vicinity of their intended mutual contact with the electrolyte layer 90. However, a conductive adhesive layer 104 joins peripheral portions of the two electrode layers 82 and 84 for completing an electronically conductive pathway beyond any region of their intended mutual contact with the electrolyte layer 90.

As shown in FIG. 6B, the display cell 80 is activated by removing the release liner 94 and folding the transparent substrate 88 together so that the electrolyte layer 90 overlaps the electrode layer 84 and extends into contact with the designated portion 100 of the electrode layer 82 for completing an ionically conductive pathway between the electrode layers 82 and 84. Since the conductive adhesive layer 104 permanently completes the electronically conductive pathway between the two electrode layers 82 and 84, subsequent completion of the ionically conductive pathway triggers electrochemical reaction resulting in the erosion of the designated portion 100 of the electrode layer 82.

Both the electrolyte layer 90 and the dielectric adhesive layer 92 are formed as pressure-sensitive adhesives to provide better bonding with the electrode layers 82 and 84. Upon applying pressure to the folded layers of the transparent substrate 88, the pressure-sensitive electrolyte layer 90 permanently completes a circuit between the electrode layers 82 and 84 so as to produce the electrochemical reaction that erodes the designated portion 100 of the electrode 82 and reveals the underlying graphics.

Another example of a display cell with an interrupted ionically conductive pathway is illustrated by FIGS. 7 and 8. The illustrated display cell 110 is similar to the assembled display cell 80 of FIG. 6B but has a passivation layer 112 separating an electrolyte layer 114 from a thin-film electrode layer 116. The passivation layer 112 comprises a fragile dielectric material that also electronically separates the thin-film electrode layer 116 from an overlying electrode layer 118 in the vicinity of their intended mutual contact with the electrolyte layer 114. A conductive adhesive layer 122 joins peripheral portions of the electrode layers 116 and 118 to complete an electrically conductive pathway between the electrode layers 116 and 118.

A graphics layer 124 on a top substrate 126 includes a window 128 along with instructions for activating the display cell 110, such as by rubbing or scratching the window 128 or by folding the entire display cell 110, to break the passivation layer 112. Once broken, the passivation layer 112 permits the electrolyte layer 114 to seep into contact with a designated portion 130 of the thin-film electrode layer 116 thereby completing an ionically conductive pathway between the electrode layers 116 and 118.

Figure 1:
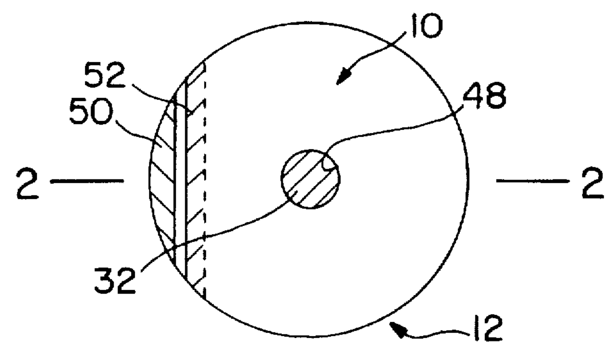
FIG. 1 is a plan view of a circularly configured voltaic, self-powered display cell arranged for revealing a visual image behind an eroding film boundary through a circular aperture.
Figure 2:
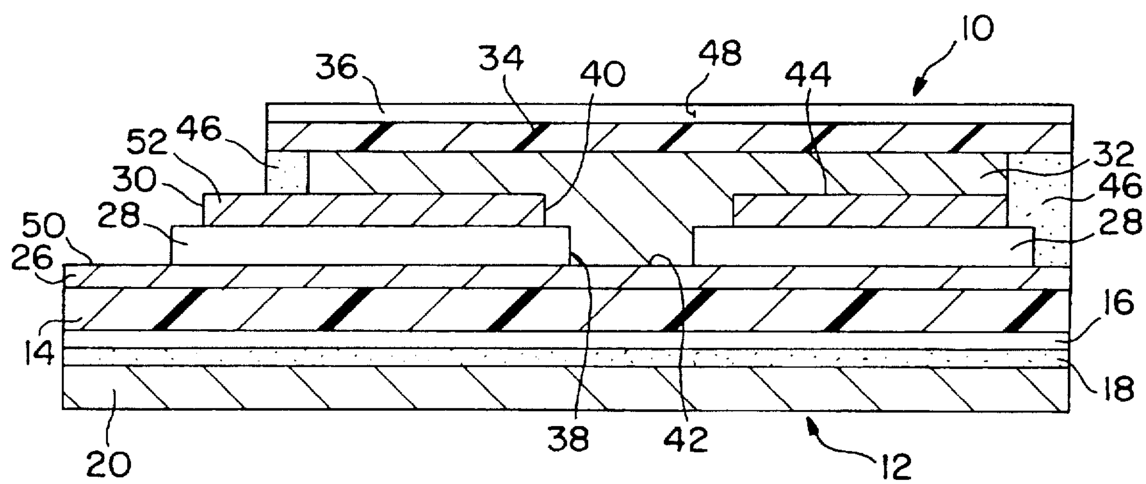
FIG. 2 is a cross-sectional view of the display cell taken along line 2—2 in FIG. 1 showing the display cell mounted on a label structure.

The resulting erosion of the designated portion 130 reveals an underlying visual image formed by a graphics layer 132 printed on a bottom substrate 134, which together with the top substrate 126 and a dielectric adhesive layer 136 provides the structural support for the display cell 110. A pressure-sensitive label structure could also be appended to the display cell 110 or to any of the preceding display cells as shown in FIG. 2.

Also, instead of viewing an image revealed behind the thin-film electrode layer 116 through a window 128 in a top substrate 126, the display cell 110 (as an example of all the preceding display cells) could be inverted and the graphics layers 124 and 132 rearranged to provide a similar viewing opportunity through a window in the bottom substrate 134. In this alternative line-of-sight direction through the display cell 110, the electrode layer 118 could be reshaped to help form the image that is revealed by erosion of the electrode layer 116. The electrode layer 118 could also be formed with multiple apertures for exposing additional portions of the electrode layer 116 to reveal more than one visual image or a more complex single image in either viewing direction.

The clearing rate of the designated portions of the thin-film electrode layer can be controlled by suitable choices of the electrode and electrolyte materials. The shapes and sizes of the electrode layers, the volume of electrolyte, and the conductivity of the electronically conductive pathway can all be arranged to further influence the clearing rate. Normally, rapid clearing of the designated portions of the thin-film electrode layer is desired to provide a quick response to events that trigger activation of the display cells. However, more gradual clearing of the designated portions can be used to provide a timing function.

A diagram of an in-line press that can be used to print and assemble the display cells described here is shown in FIG. 9. A bottom substrate 150 is unrolled and advanced to a print station 152 for application of graphics. A metalized film 154, such as vapor-deposited aluminum, is laminated at station 156 to the printed bottom substrate 150. A dielectric layer is applied in a succession of patterns to the metalized film 154 at station 158, followed by the application of a patterned carbon electrode layer at station 160, a patterned UV-curable adhesive at station 162, and a UV-curable adhesive electrolyte at station 164. A top substrate 166 is unrolled and laminated over the successions of patterns on the bottom substrate 150 at station 168. A UV-curing station 170 cures the adhesive layers to permanently bond the substrates 150 and 166 together. Another printing station 172 applies more graphics, and a die cut station 174 divides the successively patterned portions into individual display cells that can be stacked, rolled, or further processed.

The thin metal films arranged as disappearing electrode layers in the preceding embodiments are all preferably formed by deposition onto non-conductive substrates and are distinguished from metal foils that are thinned from thicker metal forms. Deposition methods include vacuum evaporation, cathode sputtering, electroplating, and various chemical reactions in a controlled atmosphere or electrolyte. The deposited metal for the anode electrode is preferably aluminum; but other metals could also be used, such as copper, zinc, silver, or gold. The deposited material for the cathode electrode is preferably carbon, but thin films such as silver can also be used in combination with the aluminum film anode.

The display cells can be switched from a first state in which the thin metal film of the anode is opaque to a second state in which a designated area of the thin metal film becomes substantially transparent, but the display cells cannot be restored to the first state. The erosion that takes place in the thin metal films to reveal visual images is irreversible. The visual images remain permanently displayed through transparent portions of the non-conductive substrates that support the thin metal films.

All of the substrates, including the substrate that normally supports the thin metal film and the pressure-sensitive adhesive-backed label stock are preferably supplied in rolls that can be unwound into an in-line press. All of the other layers, including the electrodes, the electrolyte, the dielectric, and the adhesives as well as the visual image, are preferably printed in patterns on one of the substrates by printing stations that are arranged along the press. Flexographic printing is preferred, but screen printing or other extrusion techniques may be required for printing the adhesives.

The thin metal films are preferably predeposited onto the top substrates in advance of any press operations. However, a thin metal film could also be transfer printed from a temporary carrier to the top substrate along the press, such as by hot or cold stamping. For example, a thin metal film could be transferred from the temporary carrier by cold stamping in a pattern that matches an adhesive pattern on the new substrate for shaping the electrodes.

Such in-line processing can be used to produce successions of electrochemical display cells in large volumes at low cost. Additional stations, such as die cutters, laminators, or applicators, can be used to adapt the displays for their intended use as stand-alone display cells or as display cells incorporated within other products.

We claim:

1. A self-powered electrochemical display cell comprising:

first and second electrode layers, a dielectric layer, and an electrolyte layer overlapping each other within a common stack;

each of said first and second electrode layers having front and back surfaces;

said dielectric layer being positioned between said front surface of the first electrode layer and said back surface of the second electrode layer for electronically separating said first and second electrode layers;

aligned openings formed through portions of said second electrode layer and said dielectric layer exposing a portion of said front surface of the first electrode layer;

said electrolyte layer overlapping both a remaining portion of said front surface of the second electrode layer and the exposed portion of said front surface of the first electrode layer forming an ionically conductive pathway between said first and second electrode layers; and an electronically conductive pathway between said first and second electrode layers being closeable in support of an electrochemical reaction that produces a focused electric field within said electrolyte layer cascading from said front surface of the second electrode layer through said aligned openings in the dielectric and second electrode layers to the exposed portion of said front surface of the first electrode layer for eroding the exposed portion of said first electrode layer to display visual information.

2. The display cell of claim 1 in which said opening in the dielectric layer is smaller than said opening in the second electrode layer for laterally separating the exposed portion of said first electrode layer from the remaining portion of said second electrode layer.

3. The display cell of claim 2 in which said opening in the dielectric layer has a closed shape.

4. The display cell of claim 3 in which said opening in the second electrode layer also has a closed shape.

5. The display cell of claim 4 in which said closed-shape openings in the dielectric layer and the second electrode layer are substantially circular.

6. The display cell of claim 1 in which said electrolyte layer overlaps a larger area on said front surface of the second electrode than on said front surface of the first electrode for enhancing the electrochemical reaction at the exposed portion of said first electrode.

7. The display cell of claim 1 in which said electrolyte layer is an adhesive.

8. The display cell of claim 6 in which the remaining portion of said second electrode layer is entirely overlapped by a remaining portion of said dielectric layer.

9. The display cell of claim 8 in which said first electrode layer entirely overlaps the remaining portion of said dielectric layer.

10. The display cell of claim 1 in which said first electrode layer is eroded for providing an irreversible display of the visual information.

11. The display cell of claim 10 in which said first electrode layer is a thin film that is eroded to reveal an image that provides the visual information.

12. The display cell of claim 10 in which said thin film is eroded in a pattern to form the visual information.

13. The display cell of claim 10 further comprising a graphics layer that is revealed by the erosion of said first electrode layer.

14. The display cell of claim 10 in which said second electrode layer is patterned to produce an image that is revealed by the erosion of said first electrode layer.

15. The display cell of claim 1 in which said aligned openings are a first pair of a plurality of pairs of aligned openings in said second electrode layer and said dielectric layer.

16. The display cell of claim 15 in which each of said plurality of pairs of aligned openings exposes a different portion of said front surface of the first electrode.

17. The display cell of claim 16 in which said plurality of pairs of aligned openings is overlapped by said electrolyte layer.

18. The display cell of claim 17 in which said plurality of pairs of aligned openings is arranged in a pattern for enhancing the visual information.

19. The display cell of claim 1 in which one of said first and second electrodes has different electrode potentials for functioning as a voltaic cell.

20. The display cell of claim 19 in which said first electrode also functions as a portion of said electronically conductive pathway that extends beyond the second electrode.

21. The display cell of claim 20 in which said first electrode is a metal film deposited onto a surface of a substrate.

22. The display cell of claim 21 in which said substrate surface has an area that is substantially covered by said metal film.

23. The display cell of claim 22 in which said metal film is made of aluminum.

24. The display cell of claim 1 in which said first electrode layer extends beyond both said dielectric layer and said second electrode layer, and said second electrode layer extends beyond said electrolyte layer for forming a switch interrupting said electronically conductive pathway between said first and second electrode layers.

25. The display cell of claim 24 in which said extended portion of the first electrode is foldable against said extended portion of the second electrode for closing said electronically conductive pathway between the first and second electrode layers.

26. A self-powered electrochemical display cell comprising:

first and second electrode layers having different electrode potentials;

a dielectric layer separating overlapping portions of said first and second electrode layers;

an electrolyte layer overlapping adjacent portions of said first and second electrode layers for providing an ionically conductive pathway between said first and second electrode layers;

said adjacent portion of the first electrode layer not being overlapped by said second electrode layer and said dielectric layer; and an electronically conductive pathway between said first and second electrode layers that is closeable for inducing an irreversible electrochemical reaction that erodes said adjacent portion of the first electrode layer for displaying hidden visual information.

27. The display cell of claim 26 in which said adjacent portion of the first electrode layer is a first of two adjacent portions that are not overlapped by said second electrode layer and said dielectric layer, and said second adjacent portion of the first electrode layer is not overlapped by the electrolyte layer.

28. The display cell of claim 27 in which said adjacent portion of the second electrode is a first of two adjacent portions, and said second adjacent portion of the second electrode layer is not overlapped by said electrolyte layer.

29. The display cell of claim 28 in which said second adjacent portion of the first electrode layer and said second adjacent portion of the second electrode layer are arranged as electrical contacts along said electronically conductive pathway.

30. The display cell of claim 29 in which said second adjacent portion of the first electrode layer is foldable into electrical contact with said second adjacent portion of the second electrode layer.

31. The display cell of claim 26 further comprising a substrate having front and back surfaces, and said first electrode layer substantially covers said front surface of said substrate.

32. The display cell of claim 31 in which said first electrode layer is a thin metal film.

33. The display cell of claim 31 in which said second electrode layer is a thin metal film.

34. The display cell of claim 31 in which aligned openings are made in said second electrode layer and said dielectric layer for exposing said adjacent portion of said first electrode layer to said electrolyte layer.

35. The display cell of claim 34 in which said electrolyte layer overlaps a larger area of said second electrode layer than said first electrode layer.

36. The display cell of claim 34 in which said aligned openings are one pair of a plurality of pairs of aligned openings through said second electrode and dielectric layers for exposing different portions of said first electrode layer.

37. An electrochemical display cell comprising:

at least one substrate;

first and second electrode layers covering partially overlapping regions of said at least one substrate;

an electronically conductive pathway between said first and second electrode layers;

an electrolyte layer covering a region of said at least one substrate and arranged for contacting adjacent portions of said first and second electrode layers in support of an electrochemical reaction eroding the adjacent portion of the first electrode layer to display visual information and said electrolyte layer being operatively isolated from said first electrode layer prior to its intended contact with said adjacent portions of the first and second electrode layers.

38. The display cell of claim 37 further comprising a dielectric layer covering a portion of said first electrode layer.

39. The display cell of claim 38 in which said second electrode layer covers a portion of said dielectric layer adjacent to an exposed portion of said first electrode layer not covered by said dielectric layer.

40. The display cell of claim 39 in which aligned openings are contained in said second electrode layer and said dielectric layer, and said exposed portion of the first electrode layer is located within said aligned openings.

41. The display cell of claim 40 in which said second electrode layer contacts a portion of said first electrode layer not covered by said dielectric layer for completing said electronically conductive pathway between said first and second electrode layers.

42. The display cell of claim 41 in which said dielectric layer contains another opening through which said second electrode layer contacts said first electrode layer.

43. The display cell of claim 37 in which said electrolyte layer is made of an electrolytic adhesive, and said electrolyte layer is operatively isolated from said first electrode layer by a protective layer that covers said electrolyte prior to its intended contact with said adjacent portions of the first and second electrode layers.

44. The display cell of claim 43 in which said protective layer is a release layer.

45. A succession of printed display cells made by an in-line process comprising:

a flexible web;

a first electrode layer that covers at least portions of said flexible web;

a dielectric layer arranged in a repeating pattern that covers portions of said first electrode layer;

a second electrode layer arranged in a repeating pattern that covers portions of said dielectric layer;

said repeating patterns of said dielectric layer and said second electrode layer leaving portions of said first electrode layer exposed along said flexible web;

an electrolyte layer arranged in a repeating pattern that covers portions of said second electrode layer and said exposed portions of the first electrode layer for providing an ionically conductive pathway between said first and second electrode layers;

said electrolyte layer having opposite side surfaces, and one of said opposite side surfaces of the electrolyte layer being in contact with both said first and second electrode layers; and said repeating patterns of the first and second electrode layers being arranged to support electronically conductive pathways between said first and second electrode layers so that when said electronically conductive pathways are closed, said exposed portions of the first electrode layer are eroded by electrochemical reactions for displaying visual information.

46. The display cells of claim 45 in which said dielectric layer is printed onto said first electrode layer, and said second electrode layer is printed onto said dielectric layer.

47. The display cells of claim 46 in which said electrolyte layer is printed onto both said first and second electrode layers.

48. The display cells of claim 45 in which said flexible web has front and back surfaces, and said front surface of said web is substantially covered by said first electrode layer.

49. The display cells of claim 48 in which said first electrode layer is a metal film.

50. The display cells of claim 48 in which said second electrode layer is a thin metal film.

51. The display cells of claim 49 in which said metal film is made of aluminum.

52. The display cells of claim 50 in which said metal film is made of silver.

53. The display cells of claim 48 in which said first electrode layer also functions as a common portion of said electronically conductive pathways.

54. The display cells of claim 52 in which said first electrode layer also functions as a common portion of said electronically conductive pathways.

55. The display cells of claim 45 in which said repeating patterns of said dielectric layer, said second electrode layer, and said electrolyte layer all overlapping said first electrode layer form a succession of individual electrochemical display cells.

56. The display cells of claim 55 in which said first and second electrode layers have different electrode potentials, and said electrochemical display cells are voltaic cells.

57. The display cells of claim 55 in which said first electrode layer also functions as a conductor between a plurality of said individual electrochemical display cells.

58. The display cells of claim 45 in which said flexible web includes transparent windows aligned with said exposed portions of said first electrode.

59. The display cells of claim 58 in which one of said repeating patterns of said dielectric and second electrode layers are rendered visible through said transparent window upon erosion of said exposed portions of said first electrode.

60. A method of printing a succession of electrochemical display cells comprising the steps of:

advancing a web covered by a first electrode layer through an in-line press;

printing a dielectric layer in a repeating pattern that covers some portions of said first electrode layer and leaves exposed other portions of said first electrode layer;

printing a second electrode layer in a repeating pattern that covers portions of said dielectric layer;

applying an electrolyte layer in a repeating pattern that covers portions of both said second electrode layer and said exposed portions of said first electrode layer for providing an ionically conductive pathway between said first and second electrode layers;

arranging the electrolyte layer with respect to said first and second electrode layers so that a common face of said electrolyte layer contacts both said first and second electrode layers; and arranging the repeating patterns of said first and second electrode layers to support electronically conductive pathways between said first and second electrode layers so that when said electronically conductive pathways are closed, said exposed portions of said first electrode layer are eroded by electrochemical reactions for displaying visual information.

61. The method of claim 60 in which said steps of printing the dielectric and second electrode layers include the step of forming aligned openings in said dielectric and second electrode layers for allowing said exposed portions of the first electrode layer to contact said electrolyte layer.

62. The method of claim 61 in which said step of forming aligned openings includes forming the opening in said second electrode layer larger than the opening in said dielectric layer.

63. The method of claim 60 in which said first electrode layer extends continuously between said repeating patterns of said dielectric and second electrode layers.

64. The method of claim 63 in which said web is substantially covered by said first electrode layer.

65. The method of claim 60 in which said step of applying the electrolyte layer includes printing the electrolyte layer.

66. The method of claim 60 in which said step of applying the electrolyte layer includes laminating the electrolyte layer together with a supporting substrate to the electrode layers.

67. An electrochemical display cell comprising:

first and second electrode layers laid out in patterns with said second electrode layer at least partially encircling a portion of said first electrode layer;

an electrolyte layer covering said encircled portion of the first electrode layer and a surrounding portion of said second electrode layer for completing an ionically conductive pathway between said first and second electrode layers; and an electronically conductive pathway that conveys a flow of current between said first and second electrodes in support of an electrochemical reaction that erodes said encircled portion of the first electrode layer, wherein said electrochemical reaction produces a focused electrical field between said encircled portion of the first electrode layer and said surrounding portion of the second electrode layer for enhancing erosion of said encircled portion of the first electrode layer to display visual information.

68. The display cell of claim 67 further comprising a graphics layer that is overlapped by said encircled portion of the first electrode layer and is revealed by the electrochemical reaction that erodes said encircled portion of the first electrode layer.

69. The display cell of claim 68 in which said two electrode layers and said electrolyte layer are mounted between two substrates, and at least one of said substrates is transparent to allow said graphics layer to be viewed through said transparent substrate after said encircled portion of the first electrode has eroded.

70. The display cell of claim 67 in which at least a portion of said second electrode layer overlaps another portion of said first electrode layer.

71. The display cell of claim 70 in which said overlapping portions of said first and second electrode layers are separated by a dielectric layer so that said two electrode layers are electronically isolated from each other in a presence of said electrolyte layer.

72. The display cell of claim 67 in which said surrounding portion of the second electrode layer forms an opening that exposes said encircled portion of the first electrode layer to said electrolyte layer.

73. The display cell of claim 72 in which said opening has a closed shape.

74. The display cell of claim 72 in which said opening takes the form of a character.

* * * * *